Patented Dec. 31, 1946

2,413,405

UNITED STATES PATENT OFFICE 2,413,405

FUMIGANT

Frank Leslie Campbell, Rockville, Md., and Willis Conard Fernelius, Dayton, Ohio No Drawing. Application July 21, 1944,
Serial No. 546,061

5 Claims. (Cl. 167—39)

This invention, which is a continuation-in-part of the invention of our application Serial No. 403,873, filed July 24, 1941, now United States Patent No. 2,381,257, relates to the preparation of an addition product of sulfur dioxide and ethylene oxide and to the use of the compound in a process for killing insects.

In accordance with this invention, sulfur dioxide and ethylene oxide are reacted at relatively low temperatures to form a new compound having the formula $(CH_2)_2O.SO_2$. It is believed that the oxygen atom of the ethylene oxide serves as a donor of a pair of electrons to the sulfur atom of the sulfur dioxide. In this way, a relatively weak linkage is formed between said oxygen and sulfur atoms.

The product, which is a liquid at 0° C., volatilizes rapidly at atmospheric pressure and temperatures above 0° C. Because of this, the compound can be used to excellent advantage as a fumigant. When volatilization occurs, the compound dissociates into sulfur dioxide and ethylene oxide, and both compounds exert a fumigating and insecticidal effect.

The addition product of ethylene oxide and sulfur dioxide is especially adapted for commercial use as a fumigant and insecticide because it can be handled very conveniently as a liquid in sealed containers and can be readily transported, whereas both ethylene oxide and sulfur dioxide are gaseous at room temperature. Furthermore, the material vaporizes over a period of time, can be released gradually, and provides a prolonged fumigating action. The killing of insects exposed to the vapors from the addition compound is very fast due to the insecticidal properties of both the ethylene oxide and the sulfur dioxide which are liberated.

While it is well known to fumigate with sulfur dioxide, such fumigating processes have proven to be very cumbersome and hazardous. Heretofore, it was necessary to use compressed sulfur dioxide or to burn either sulfur candles or carbon disulfide absorbed on diatomaceous earth. Unskilled operators could not use compressed gas without endangering themselves, and it was practically necessary to engage professional fumigators. Also, in many instances where, for example, the space to be fumigated was small, the use of compressed sulfur dioxide was impractical. The use of sulfur candles has always left much to be desired. In addition to the dangers attendant upon the burning of sulfur, the method at best was haphazard, and it gave no assurance that sufficient sulfur dioxide would be generated for complete and thorough fumigation. Similarly, the burning of carbon disulfide was both unsatisfactory and particularly hazardous.

When the product of this invention is used as a fumigant, there is no risk of danger to operators. Furthermore, thorough fumigation is assured because the compound is of known composition and volatilizes completely at room temperature and, therefore, the amount required for fumigating any given enclosure can be calculated or estimated easily. This makes for economy, as only the required amount need be used. In the fumigating of insect-infested enclosures, it is necessary only to open a container of the compound in the enclosure and to vaporize a sufficient amount of compound to kill all insects therein.

The container may be, for example, a can with a lid or portion which may be easily removed or punctured. When the container is exposed to the atmosphere, the compound begins to volatilize at once but not so rapidly as to injure the user. In a short time, the required quantity is vaporized and fumigation is complete. Alternatively, the compound may be sprayed into enclosures which require fumigation. This can be done very conveniently by means of containers equipped with thumb-operated valves, such as the so-called siphon used in dispensing charged water or the device used to apply whipped cream by releasing nitrous oxide under pressure. A particularly satisfactory method of employing the material of this inention is to saturate powders, pellets, or balls of clay, diatomaceous earth, talc, and the like, with the compound. These may be kept in sealed containers and used as needed. Extenders solid carriers, or fillers thus saturated are especially suited for use in small enclosures such as drawers, boxes, closets, et cetera.

Diluents or liquid carriers which are miscible with the addition compound may be used in conjunction therewith. Their presence often facilitates the use of the addition compound. Suitable liquid carriers include miscible hydrocarbon solvents and halogenated hydrocarbon solvents.

The addition product of ethylene oxide may be prepared by passing sulfur dioxide into liquid ethylene oxide which is maintained at low temperatures, preferably at or below 0° C. Alternatively, the two materials may be reacted in an autoclave under pressure at higher temperatures. Preferably, equimolecular amounts are reacted, although a considerable excess of the ethylene oxide may be present if desired.

The following example illustrates a preferred method of preparing the addition product of ethylene oxide and sulfur dioxide.

A tared flask containing 440 grams (10 mols) of ethylene oxide was immersed in a salt-ice bath. Sulfur dioxide was passed into the ethylene oxide until a total weight equal to 640 grams (10 mols) had reacted to form addition product having the formula $(CH_2)_2O.SO_2$. This product was a liquid which vaporized rapidly at room temperature and atmospheric pressure.

We claim:

1. As a new composition of matter, the addition product of ethylene oxide and sulfur dioxide having the formula $(CH_2)_2O.SO_2$.

2. A fumigating and insecticidal material comprising the addition product of ethylene oxide and sulfur dioxide having the formula $(CH_2)_2O.SO_2$ and a carrier therefor.

3. A fumigating and insecticidal material comprising the addition product of ethylene oxide and sulfur dioxide having the formula $(CH_2)_2O.SO_2$ and a diluent miscible therewith.

4. A process for killing insects which comprises exposing insects to the vapors of the addition product of ethylene oxide and sulfur dioxide, said addition product having the formula $(CH_2)_2O.SO_2$.

5. A process for fumigating an insect-infested enclosure which comprises vaporizing at atmospheric pressure within said enclosure the addition product of ethylene oxide and sulfur dioxide, having the formula $(CH_2)_2O.SO_2$, in an amount sufficient to kill all insects within said enclosure.

FRANK LESLIE CAMPBELL.
WILLIS CONARD FERNELIUS.